W. PROHASKA.
FEED REGULATOR.
APPLICATION FILED JULY 10, 1916.

1,247,453.

Patented Nov. 20, 1917.

William Prohaska
Inventor

By Geo. F. Kimmel
Attorney

UNITED STATES PATENT OFFICE.

WILLIAM PROHASKA, OF EARLHAM, IOWA.

FEED-REGULATOR.

1,247,453.   Specification of Letters Patent.   Patented Nov. 20, 1917.

Application filed July 10, 1916. Serial No. 108,364.

*To all whom it may concern:*

Be it known that I, WILLIAM PROHASKA, a citizen of the United States, and resident of Earlham, in the county of Madison and State of Iowa, have invented certain new and useful Improvements in Feed-Regulators, of which the following is a specification.

The present invention relates to concrete mixers and has particular reference to new and useful improvements in feed regulator attachments therefor.

The primary object of my invention is to provide a feeder attachment for concrete mixers and the like by means of which the supply of concrete, cement, or sand may be readily controlled without stopping the mixing device.

Another object of my invention is to provide a device of the class described which may be attached to any of the existing types of longitudinal movement mixing devices without material structural alteration of the mixing device proper.

Other objects and advantages to be derived from the use of my improved feeder attachment for concrete mixers will appear from the following detail description and the claims, taken with an inspection of the accompanying drawing, in which:

Figure 1:
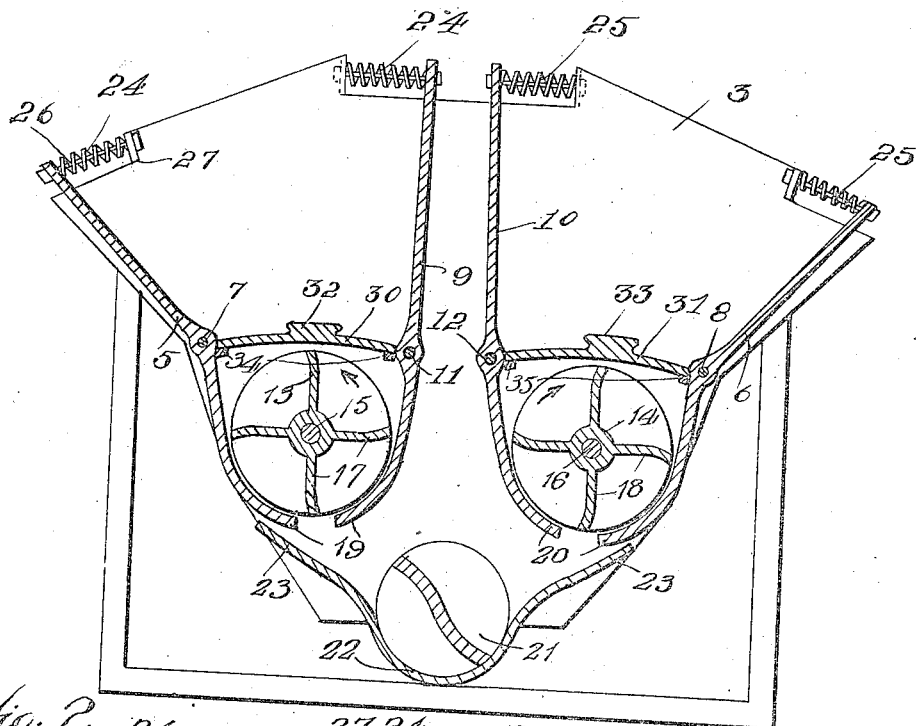
Figure 1 is a transverse vertical sectional view.
Figure 2:
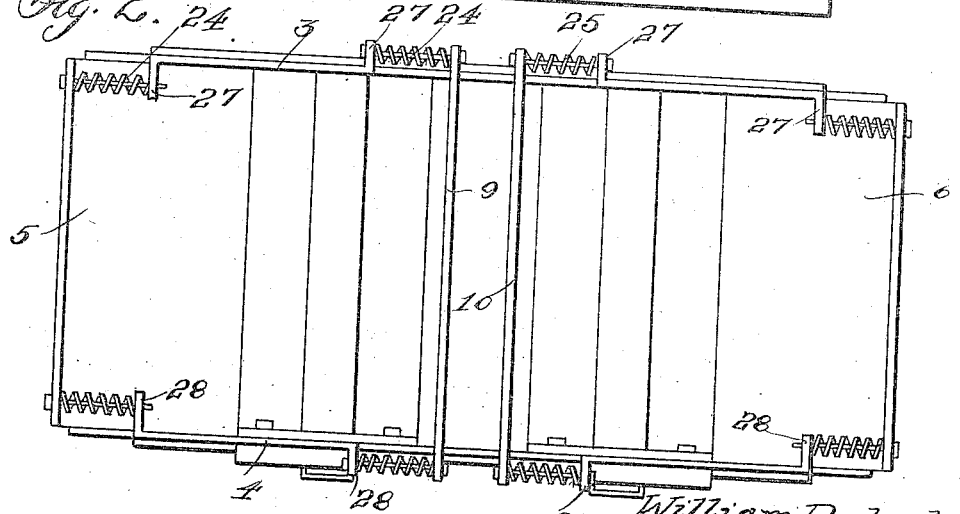
Fig. 2 is a top plan view.

Referring more particularly to the drawings, similar characters of reference designate like and corresponding parts throughout the various views. The feeder is supported in a pair of frames, said frames supporting the end walls 3 and 4 of the feeder body.

The sides of the feeder body are designated 5 and 6, said sides being pivotally mounted on transverse rods 7 and 8, respectively, said rods being mounted in the end walls 3 and 4 and serving to rigidly connect said walls. A pair of inner partitioning walls 9 and 10 are provided pivoted on transverse rods 11 and 12, respectively, the walls 5 and 9 and 6 and 10 forming receiving chambers for the feeder. A pair of delivering rollers 13 and 14 are mounted on transverse shafts 15 and 16 adjacent the lower ends of said walls 5, 6, 9 and 10, said rollers being provided with a plurality of wings 17 and 18.

The lower free end of the walls 5 and 9 are curved inwardly as at 19 to partly embrace the roller 13, and the walls 6 and 10 are likewise formed as indicated at 20. The mixing auger is shown in Fig. 1, the same being designated 21 and being of the horizontal type. The auger 21 is carried in a casing 22, said casing being provided with flared walls 23 beneath the free ends of the walls 5, 6, 9 and 10, whereby to receive the contents of the feeder when the latter is in operation.

In order to allow the walls 5, 6, 9 and 10 to accommodate themselves to various densities of material being fed I provide a plurality of spring elements 24 and 25 mounted on guide rods 26, said spring elements being interposed between said walls 5, 6, 9 and 10 and lugs 27 and 28 formed on the end walls 3 and 4, respectively.

I provide means for controlling the delivery of the contents of the feeder to the delivering rollers and thence to the auger, said means including in the present instance a pair of sliding plates 30 and 31, said plates being provided with longitudinal rims 32 and 33, respectively, said rims being substantially T-shaped in cross-section. The plates 30 and 31 are mounted on sets of rods 34 horizontally arranged.

It is to be understood that in the provision of my improved feeder and controller for concrete mixers I contemplate the provision of means whereby the exact proportion of sand, cement, lime or other substances may be had with the least difficulty, the device accurately controlling, at all times, the supply of material. If desired the rollers 13 and 14 may receive rotative power from the auger driving mechanism.

In operation it will be clear that control of the relative proportions of the materials contained in the feeder may be readily had by sliding the plates 30 and 31 into and out of their respective chambers, said plates being locked in the position to which the same have been moved. It is clear that should a lump or lumps be delivered to the delivering rollers 13 and 14 the yieldable sides 5, 6, 9 and 10 will accommodate said lumps and prevent breakage.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a feeding mechanism, a frame, hoppers mounted thereon, each having movable side walls, lateral extensions projecting from the end walls of the receptacles, and spring means engaging the movable walls and the extensions of each hopper and forcing the walls thereof away from each other.

2. In a mixing machine, a frame, hoppers arranged side by side on the frame each comprising hinged side walls, expansible means connected with each hopper forcing the side walls away from each other, and feeding rollers mounted between the side walls.

In testimony whereof, I affix my signature hereto.

WILLIAM PROHASKA.

Copies of this patent may be obtained for five cents each, by addressing the "Commissioner of Patents, Washington, D. C."